Dec. 27, 1966  C. J. FOSTER  3,293,866
DRY DOCKING METHOD
Filed Dec. 24, 1963  3 Sheets-Sheet 1

INVENTOR.
CHRISTOPHER J. FOSTER.

INVENTOR.
CHRISTOPHER J. FOSTER.

Dec. 27, 1966     C. J. FOSTER     3,293,866
DRY DOCKING METHOD
Filed Dec. 24, 1963     3 Sheets-Sheet 3

INVENTOR.
CHRISTOPHER J. FOSTER.

3,293,866
DRY DOCKING METHOD
Christopher Jerome Foster, Sands Point, N.Y.
(44 Whitehall St., New York, N.Y. 10004)
Filed Dec. 24, 1963, Ser. No. 333,218
5 Claims. (Cl. 61—65)

This invention relates to a method and means for increasing the utility of dry docks. More particularly, the invention relates to an improved technique for dry-docking large ships, and for initially launching large ships which are built within a dry dock.

In using a graving dry dock for dry-docking a ship in accordance with conventional techniques, the dock is first dewatered, the ship's cribbing is preset, the dock is flooded with sea water, its gate is then opened, and the ship is floated therein, whereup the gates of the dock are closed and the water pumped therefrom so that the ship is supported by the preset cribbing which has been appropriately situated on the floor of the dock. In launching a ship from a graving dry dock, the dock is first flooded to sea water level so as to float the ship clear of the supporting cribbing within the dock, the dry dock gates are opened, and the ship is then floated out of the dock. This launching technique is, of course, the same whether the ship was initially dry-docked for repairs, or was initially built within the dry dock. In accordance with conventional floating dry dock techniques, the floating dock is partially submerged and the ship is floated therein and positioned over preset cribbing on the floor thereof, whereupon the water ballast which has caused the partial submersion of the dry dock is pumped therefrom to buoy the dock and lift the ship out of the water.

Whether a graving of a floating type dry dock is used, it is apparent that the elevation of the floor of a graving dock (which elevation is, of course, considerably below sea level), or the lowest attainable submerged elevation of the floor of a floating type dry dock, has heretofore imposed a limitation upon the utility of either type dry dock in receiving ships of relatively deep draft. That is, existing dry docks of either the graving or floating type cannot be utilized in accordance with conventional dry-docking and launching techniques where the normal floating draft of the vessel is greater than the depth below sea level at which the fixed floor of a graving dry dock is situated, or which is attainable by the floor of a floating dock when in its maximum partially submerged condition. Of course, the ship must not only clear the floor of the dock, but must also clear the keel blocks and bilge blocks upon which it will rest when in dry-docked condition and therefore, in fact, the elevation of the dry dock floor must acutally be considerably lower than that of the underbottom of the floating ship in order to properly receive the latter.

It is well known that the cost of building a graving dry dock increases considerably as its desired depth becomes greater, and that the cost of building a floating dry dock similarly increases as the intended maximum partially submerged draft thereof is made greater. To either build new dry docks, or to increase the draft capacity of existing dry docks to accommodate modern deep draft vessels, which may require as much as 30 to 40 feet docking draft over the support cribbing, would no doubt involve prohibitive expense. However, by the present invention, existing shallow draft dry docks or ship basins may be utilized for dry-docking, or for initially constructing and launching vessels whose normal draft is greater than as would ordinarily be accommodated by the dock. The method which is provided by the invention involves the use of certain apparatus whose cost is far less than the additional cost as would be required to build new dry docks, or to modernize existing dry docks, for accommodating such deep draft vessels.

Briefly describing the present invention as employed in dry-docking a ship in a dock which is more shallow than the normal draft of the vessel, the ship is buoyed up as it sits in the waterway outside the dock and is thereby lifted a distance such that its underbottom, as well as that of the apparatus used in so buoying the ship, need clear only the floor of the dock on which the ship must be positioned. The ship is then moved into the flooded dock and lowered so that it is supported by the floor of the dock, whereupon the dock is dewatered in conventional manner.

In its preferred embodiment, the apparatus provided by the invention for lifting the ship partially out of the water in the described manner includes a horizontally disposed truss type floor structure which incorporates tanks, such as wing tanks or pontoons, which may be flooded or emptied to render the floor structure alternately buoyant and submersible for a purpose as will be described. The ship will be supported on this floor structure both during the dry-docking or launching of the ship and when the ship is in fully dry-docked condition. Accordingly, the width of the floor structure is adequate to accommodate the width of the ship, and the floor structure is adapted to receive the conventional keel blocks or cribbing by which the ship will be eventually supported in upright condition when dry-docked. The length of the floor structure may be any convenient standard so that a plurality of such flat floor structures, arranged in tandem, may be employed in docking a ship having considerable length.

A vertically disposed and floatable sidewall tank is connected to each side of the floor structure at appropriate times as will be described, the detachable connection including angle bracing to withstand bending moment forces as may be anticipated during the contemplated buoying up of the ship, and further including vertical slidable interlocks to permit vertical movement of the sidewall tanks and floor structure relative to each other at certain times in the docking or launching operation. The sidewall tanks are utilized as the principal means to impart the additional buoyancy to the ship to elevate it in the contemplated manner while the ship is in the seaway outside the dry dock.

Together, the truss type floor structure and sidewall tanks provide a cradle by which the ship is first lifted to a shallower draft, and then moved into the dry dock. Since the ship is at all times supported on the floor structure, including the time when the ship is in the dry dock, it becomes apparent that, where the apparatus of the invention is employed in docking ships in a graving dock, one dewatering operation and one subsequent flooding operation, as would otherwise be necessary for the purpose of rearranging the cribbing to accommodate a different ship, are eliminated. Furthermore, it will become apparent that a deep draft ship may be initially built within a shallower dock or boat basin and subsequently easily launched by building the ship on the floor structure provided by the present invention which, at the time of building the ship, is situated on the floor of the dry dock.

When a ship is to be dry-docked using the technique of the present invention, the referred to floor structure is floated in the waterway outside of the dry dock, and the appropriate keel blocks and bilge blocks are suitably arranged thereon to accommodate the underbottom contour of the ship in conventional manner. As previously mentioned, several of such floating floor structures may be arranged, and connected if desired, in tandem so that the several cradle assemblies will provide the necessary buoyancy for lifting the ship, and accommodate its length.

The floating sidewall tanks are then water-ballasted to a predetermined draft and moved adjacent to the respective sides of the floating floor structure for engagement of the aforementioned vertical slidable interlocks therebetween. Each slidable interlock is formed by a vertical guide rail rigidly attached to the sidewall tank, and a co-mating jaw-clamp which is detachably connected to the floor structure and which slidably engages the sidewall tank guide rail. Several such interlocks are provided between each sidewall tank and the floor structure. When the slidable interlocks are thus initially engaged, the aforementioned tanks of the floor structure are flooded to sink the floor structure to the level of the bottom ends of the sidewall tanks, the floor structure being guided in its downward movement by the interconnection between the sidewall tank guide rails and the jaw-clamps which are at this time attached to the floor structure. The floor structure is locked in this position by making an apppropriate number of pin connections between the sidewall tanks and floor structure. The sidewall tanks are then additionally ballasted with sea water as necessary to submerge the entire cradle assembly to a desired depth which is deeper than the draft of the ship by an amount sufficient to permit the ship to float freely therein.

The ship is then moved into the cradle assembly and positioned over the cribbing on the floor structure in conventional manner. Thereafter an appropriate amount of water ballast is removed from the sidewall tanks, and from the aforementioned tanks of the floor structure, to render the same more buoyant and thereby elevate the ship and cradle assembly to an elevation at which its draft is less than that of the dock within which the ship and cradle assembly will then be moved.

The cradle assembly is either self-propelled or towed into the flooded dry dock, and it will be noted that particular positioning of the cradle assembly within the dock is unnecessary. That is, the cradle assembly and its contained ship may be moved to any desired location within the dock to leave room for another ship to be docked.

Water ballast is then introduced into the sidewall and floor structure tanks to sink the cradle assembly into supported relation on the floor of the dry dock. The aforementioned pin connections and interlocks are disengaged, the latter by disengagement of a number of pin connections by which the jaw-clamps are mounted on the floor structure, and the sidewall tanks are then refloated clear of the floor structure. Thereafter, all of the floating sidewall tanks are either towed or self-propelled out of the dry dock, the gates of the dry dock are closed, and the dry dock is dewatered in conventional manner. The ship is then in dry-docked condition, supported by the cradle assembly floor structure which rests on the floor of the dock.

To thereafter launch the ship, or to launch a ship which has been built on the cradle assembly floor structure within the dock, the dock is flooded in conventional manner, its gates are opened, and appropriate sidewall tanks are floated to their respective positions adjacent the sides of the cradle assembly floor structure. Sea water ballast is introduced into the sidewall tanks to sink the same to the floor of the dry dock in position for reattaching the aforementioned pin connection and vertical slidable interlocks between them and the floor structure. After all of the pin connections, including those at the several slidable interlocks, have been engaged, the cradle assembly is floated off the dry dock floor by ejecting a portion of the water ballast from the sidewall tanks. The cradle assembly with its contained ship is then moved out of the dry dock and into the adjacent seaway. Water ballast is again added to the sidewall tanks so that the ship is lowered to its normal floating condition, within the cradle assembly, and clear of the keel blocks and bilge blocks which are attached to the floor structure of the latter. The ship is moved out of the partially submerged cradle assembly, whereupon the launching operation is completed.

Leaving the vertical slidable interlocks in engagement, the main pin connections between the cradle assembly floor structure and the sidewall tanks are then disengaged. Water is pumped from the floor structure tanks to render the floor structure floatable, whereupon the floor structures rises to a floating condition between the sidewall tanks. In the course of its upward movement, the floor structure is guided by the vertical slidable interlocks and it will be noted that, when the sidewall tanks are ballasted for the proper draft, their vertical guide rails and the jaw clamps, which are now attached to the floor structure, will come into positioning relative to each other for disengagement when the floor structure reaches full floating condition. The sidewall tanks may now be floated away from the floating floor structure. The cribbing may then be rearranged on the floating floor structure to accommodate a ship of different size, which may also be dry-docked in the same dry dock using the same cradle assembly apparatus.

It will also be apparent that the described dry-docking method and apparatus may be employed in the same manner in dry-docking a deep draft ship, whether the dry dock in which the ship will ultimately be placed is of the graving type or of the floating type.

These and other objects, features and advantages of the present invention will become more fully apparent from the following detailed description thereof when taken with reference to the accompanying drawings in which.

Figure 1:
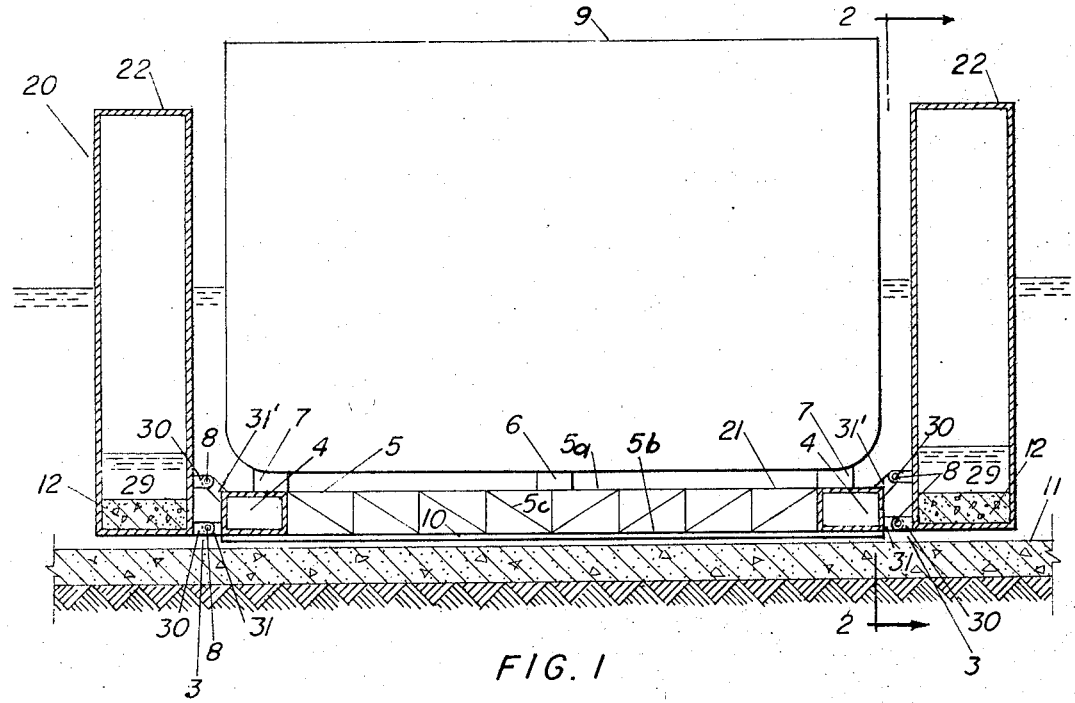
FIGURE 1 is an end view, in cross-section taken as indicated by lines 1—1 in FIGURE 2, showing a cradle assembly dry-docking apparatus in accordance with the present invention.
Figure 2:
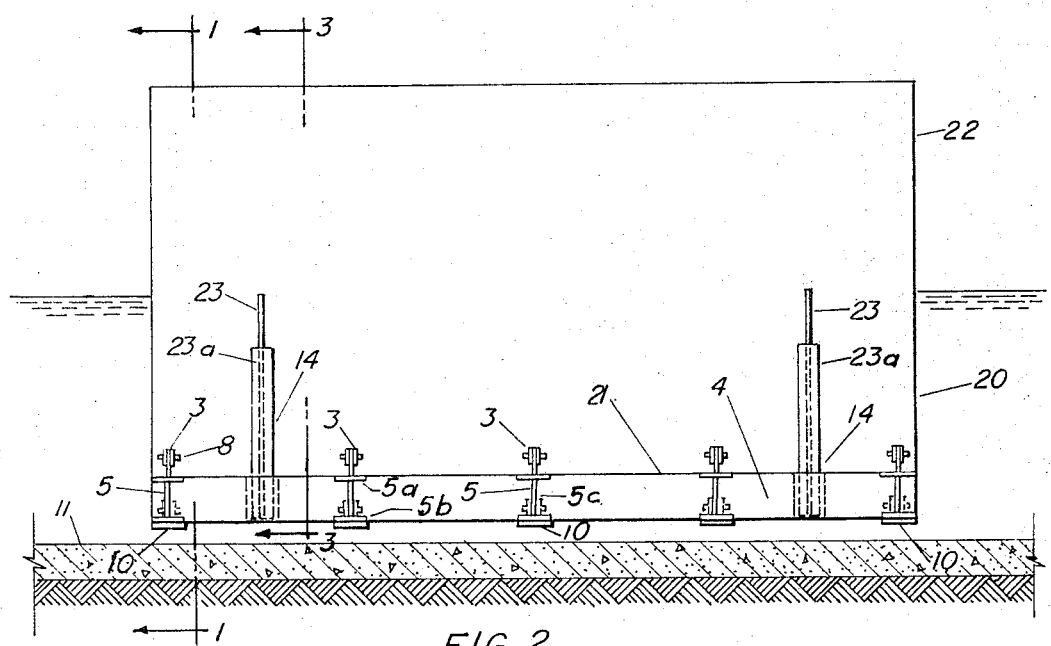
FIGURE 2 is a side elevational showing of the apparatus, the view being partially in cross-section as seen from lines 2—2 of FIGURE 1.
Figure 5:
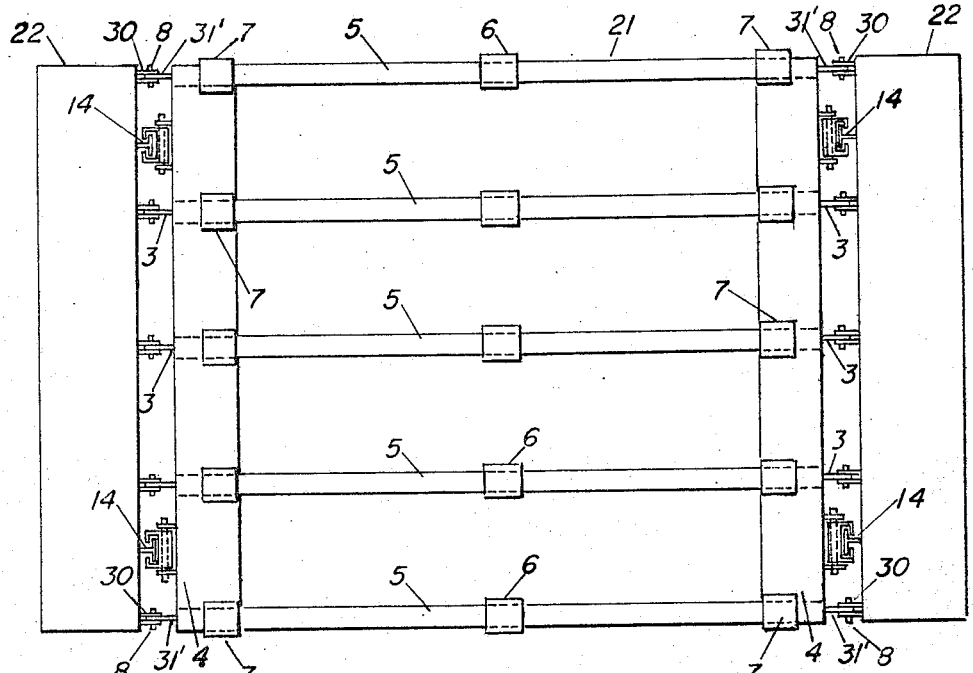
FIGURE 5 is a plan view of the cradle assembly dry-docking apparatus of FIGURES 1-3 to further illustrate its details.

Referring first to FIGURES 1, 2 and 5 of the drawings, a cradle assembly in accordance with the invention is generally indicated by reference numeral 20. The assembly 20 is formed by a horizontally disposed truss type floor structure which is generally indicated by reference numeral 21, and a pair of vertically disposed sidewall tanks, each indicated by numeral 22, which are respectively disposed at the sides of the floor structure 21. FIGURE 1 shows the cradle assembly 20 in its buoyed condition supporting a ship whose hull is generally indicated by reference numeral 9, in which condition the cradle assembly and ship are floated into a dry dock (not fully illustrated) having a load supporting floor 11. During this stage of the dry-docking operation the sidewall tanks 22 are connected to the cradle assembly floor structure 21 by pin connections which are generally indicated by reference numerals 3, and by the vertical slidable interlocks which are generally indicated by reference numeral 14.

The floor structure 21 is formed by a series of transversely disposed and longitudinally spaced apart trusses 5 (see FIGURE 5), each of which has an upper chord 5a, a lower chord 5b (see FIGURE 2) and diagonal bracing 5c (see FIGURE 1), the latter forming the web of the truss. The trusses 5 are attached together in longitudinal direction by a pair of hollow and buoyant wing tanks 4 which are respectively longitudinally disposed along each of the sides of the floor structure 21, as more clearly shown by FIGURE 5. Together, the trusses 5 and wing tanks 4 form the rigid and floatable floor structure 21, means of a conventional type (not shown) being provided for alternately admitting sea water to the tanks 4 for submerging the structure, and ejecting the water therefrom to float the structure.

Figure 6:
FIGURE 6 is an end view showing, to a reduced scale, of several such apparatus to further illustrate its use, certain of the parts thereof being shown either detached or removed.

Referring briefly to FIGURES 1, 2 and 6, it is seen that the pin connections 3 between the sidewall tanks and the floor structure are formed by a number of longitudinally spaced apart pairs of laterally projecting arms 30 which are rigidly attached to the sidewall tanks 22, and comating projecting arms 31 and 31' which are rigidly attached to the floor structure respectively at the ends of the lower chord 5b and the upper chord 5a of each truss 5. The arms 31 project laterally, but the arms 31' project outwardly and upwardly at an angle of 45°. When the comating arm pairs 30, 31 and 30, 31' are connected together by the pins 8 as shown, the arm pairs 30, 31 provide a lateral bracing connection between the lower truss chords 5b and the sidewall tanks 22, and the arm pairs 30, 31' provide a diagonal bracing connection between the upper truss chords 5a and the sidewall tanks 22 for resisting bending moment forces as may be anticipated during the intended use of the cradle assembly 20.

During operations, the pins 8 may be manually placed in and removed from the aligned apertures (not numbered) of the comating arms 30, 31 and 30, 31' and, in such case, may include bolt heads and nuts (not shown) for preventing their accidental dislodgement. Alternatively, the pins 8 may be inserted and removed automatically using a conventional type of hydraulic piston arrangement (not shown) which would be actuated by remote control at appropriate times as will be described.

Figure 3:
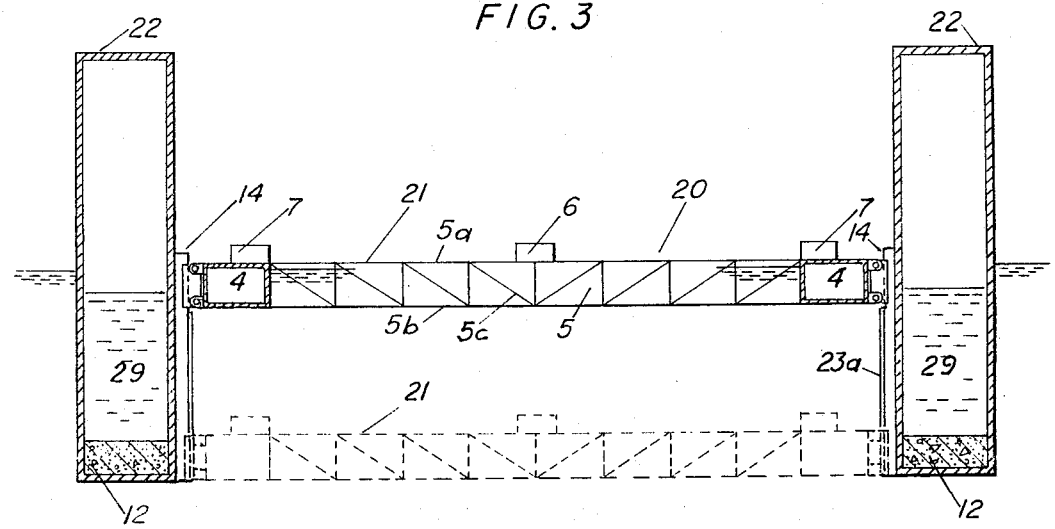
FIGURE 3 is a cross-sectional end view similar to that of FIGURE 1 but showing the apparatus in a different condition during its use, the view being taken as indicated by lines 3—3 in FIGURE 2.
Figures 7, 8:
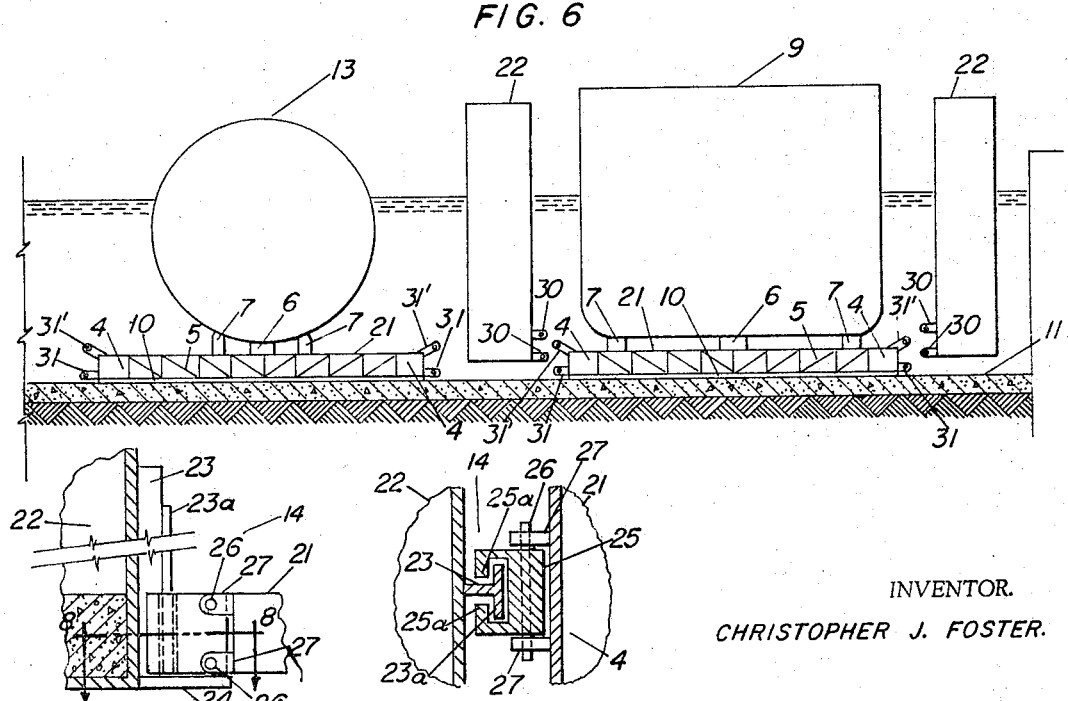
FIGURE 7 is a side elevational detail of one of the vertical slidable interlocks as is incorporated in the apparatus of FIGURES 1-5.
FIGURE 8 is a cross-sectional view of the vertical slidable interlock, the section being taken at lines 8—8 of FIGURE 7.

The detachable connection between the floor structure 21 and the sidewall tanks 22 also includes a number of vertical slidable interlocks 14 as generally illustrated in FIGURES 2, 3 and 5, and as shown in detail by FIGURES 7 and 8. Each interlock 14 includes a vertical guide rail 23 rigidly attached to the sidewall tank 22, the rail 23 having a flange 23a spaced away from the sidewall tank, thus providing a T-shaped cross-section as shown. The flange 23a is terminated short of the top end of the rail 23, as indicated in FIGURE 2, for a purpose as will be described. Referring to FIGURES 7 and 8, at the lower end of each rail 23 there is a plate stop 24 which effectively closes the end of the rail. The slide connection and interlock is provided by the jaw clamp 25 which is detachably connected to floor structure 21 by the pins 26 which pass through the lugs 27 (which are attached to floor structure 21) and through the jaw clamp 25 as indicated in FIGURES 7 and 8. The pins 26 may be manually inserted and removed, in which case they would be provided with bolt heads and nuts (not shown) or, alternatively, they may be automatically inserted and removed by conventional and remotely controlled hydraulic cylinder apparatus (not shown). The jaw clamp 25 has clamp arms 25a which engage the flange 23a of the guide rail 23, as shown, thus permitting and confining the slidable movement between the jaw clamp 25 and the guide rail 23.

The floor structure 21 has centrally located keel blocks 6 and laterally adjustable and changeable bilge blocks 7 on each of its trusses 5 which together provide the conventional cribbing as shown for supporting ships of different size and cross section thereon in conventional manner.

The sidewall tanks 22 are of hollow buoyant construction, and may be ballasted to assure their upright position by concrete as indicated by reference numeral 12 (FIGURES 1 and 3). Each sidewall tank is equipped with suitable valves and pumps or compressed air apparatus (not shown) for admitting and ejecting sea water ballast to partially submerge and refloat the same in manner as will be described. In addition, each sidewall tank may incorporate self-propulsion apparatus (not shown) so that it may travel and maneuver under its own power, rather than requiring towing for its movement and positioning in the contemplated manner.

Referring now to the manner of using the cradle assembly 20 in carrying out the dry-docking method contemplated by the invention, reference is first made to FIGURE 3. The cradle assembly is there shown in a floating condition in the waterway outside the dry dock (not shown) in which the ship will ultimately be placed. The bottom of the waterway is indicated by reference numeral 15.

While the floor structure 21 is in floating condition as shown by full lines in FIGURE 3, the keel blocks 6 and bilge blocks 7 are preset to receive and support the hull of the ship 9. It will be noted that, at this initial stage of the operation, the jaw clamps 25 of all of the vertical slidable interlocks 14 are attached, by the pins 26 (FIGS. 7 and 8), to the floor structure 21, and that the sidewall tanks 22 need not necessarily be adjacent to the floating floor structure but, indeed, may be in use elsewhere thus promoting economy in the actual number of sidewall tanks 22 as are required in total yard operations. As indicated in FIGURE 4, an adequate number of floor structures 21 are arranged in tandem, and may be connected together if desired, for accommodating the length and subsequent buoyancy requirements of the ship 9.

After the cribbing has been preset to accommodate the ship, a pair of sidewall tanks 22 are floated into adjacent relationship with the respective sides of each floating floor structure 21, as shown in FIGURE 3. Water ballast 29 is added to each tank 22 in sufficient quantity to partly submerge both tanks to a uniform draft elevation at which the open upper ends of the vertical guide rails 23 engage the respective openings of the jaw clamps 25, the upper ends of the guide rail flanges 23a being below the elevation of the jaw clamps 25 as illustrated.

Ballast water is then added to the floor structure wing tanks 4 to sink the same to the elevation shown by dotted lines in FIGURE 3. In this submerged position of the floor structure the jaw clamps 25 bottom against the stops 24 at the ends of the respective guide rails 23 (see FIGURE 7), and it will be noted that all of the pin apertures of the respective arm pairs 30, 31 and 30, 31' are commensurately brought into alignment with each other. Connection pins 8 are then inserted in these pin apertures, either manually by a diver or automatically as aforesaid, whereupon the cradle assembly is fully attached together.

Figure 4:
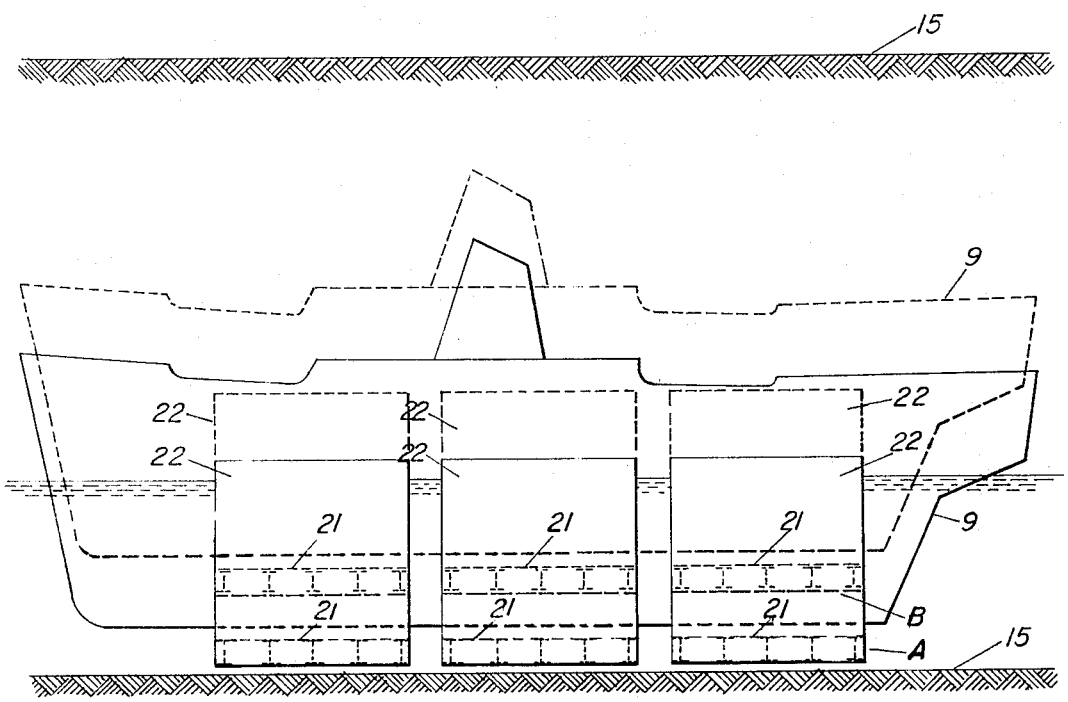
FIGURE 4 is a side view, to a reduced scale, illustrating a step in the dry-docking method provided by the present invention.

Additional water ballast 29 is added as necessary to each of the sidewall tanks 22 to submerge the cradle assembly 20 to the draft elevation A as shown by full lines in FIGURE 4, at which the keel blocks 6 and bilge blocks 7 are situated lower than the underbottom of the ship 9. The ship 9 is then moved into the cradle structure, or structures, as also shown by full lines in that figure, and appropriately positioned over the keel blocks 6 and cribs 7.

Next, water ballast 29 is pumped or otherwise ejected from each of the sidewall tanks 22 in sufficient quantity to buoy the cradle assemblies 20 and their contained ship 9 to a draft elevation B as indicated by dotted lines in FIGURE 4, such that the cradle assemblies are floating with shallower draft than the draft elevation of the dry dock floor 11 (see FIGURE 1) on which the ship will ultimately be docked. Of course, the ship 9 has thus been correspondingly elevated above its normal draft level, and rests on keel blocks 6 and bilge blocks 7.

Referring now to FIGURE 1, it will be understood that the cradle assemblies 20 may be towed or self-propelled in this elevated condition into the dry dock which is then in its flooded condition with its entrance gate open. When moved into the dock, the cradle assemblies 20, and therefore the ship 9 may be positioned at any location within the dock.

When in position within the dock as illustrated in FIGURE 1, additional water ballast 29 is introduced into the sidewall tanks 22 to sink the cradle assemblies into floor supported relation with the dock floor 11. To account for any unevenness in the dock floor, and so as to uniformly distribute the ship's weight thereto, the bottom chord 5b of each truss 5 of each cradle assembly floor structure 21 has a soft wood crushing block 10 attached therealong, as shown in several figures of the drawings. Similar crushing blocks may, of course, be attached to the undersides of the sidewall tanks 22.

With the cradle assemblies and their contained ship thus situated, all of the pins 8 are removed from the pin connections 3, and all of the pins 26 are removed from the slidable interlocks 14, so that the sidewall tanks 22 are then completely disconnected from the cradle assembly floor structure 21. A portion of the water ballast 29 is then pumped or otherwise ejected from each of the sidewall tanks 22 to buoy the sidewall tanks and float the same off the dry dock floor 11. In this floated condition, and referring now to FIGURE 6, it is seen that the sidewall tanks 22 may be moved laterally out of their adjacent relation with the floor structures 21, and that they may then be towed or self-propelled out of the dry dock. It should be noted that the jaw clamps 25 will at this time be situated on the respective sidewall tank guide rails 23, resting against the bottom stop 24 thereof.

The gates of the dry dock (not shown) may then be closed, and the dock dewatered, whereupon the ship 9 will be in fully dry-docked condition though resting on the cradle assembly floor structures 21 which remain in the dry dock.

As shown in FIGURE 6, and as previously mentioned, the keel blocks 6 and bilge blocks 7 of the floor structure 21 may be interchanged and rearranged to receive and support ships having different cross sections, such as is indicated by, for example, the circular cross section of a submarine hull 13. It also becomes apparent that the cradle assembly apparatus as has been described may be utilized to position a plurality of ships for dry-docking within the same dry dock.

To launch a deep draft ship which has been previously dry-docked using the apparatus, or which has been initially built on the floor structure 21 of the apparatus, the dry dock is flooded in usual manner and its entrance gates are then opened. The ship 9 will not float since its normal draft is greater than the draft elevation of the dry dock floor 11.

The sidewall tanks 22 are ballasted to float at respective draft elevations as indicated in FIGURE 6, and are moved into the dock into adjacent relationship with the respective sides of the floor structures 21. When positioned so that the aforementioned pin connections and the slidable interlocks 14 are in vertical alignment, each sidewall tank is additionally ballasted so as to sink the same onto the dry dock floor 11. All of the pins 8, and all of the pins 26, are then inserted so as to engage all of the pin connections 3 and interlocks 14, whereupon the cradle assembly 20 has been completely reassembled.

Water ballast is then removed from the sidewall tanks 22 to float the cradle assemblies 20 and their contained ship 9 off the dry dock floor 11, whereupon the cradle assemblies and ship will be in floating condition within the dock as shown in FIGURE 1. The assembly is then moved out of the dock and into the adjacent waterway.

When floating at this draft elevation B (see FIG. 4) in the outside waterway, sea water ballast is added to the sidewall tanks 22 to submerge the same to the lower draft elevation A, whereupon the ship 9 is floating normally and is free of the keel blocks 6 and cribs 7. After the ship 9 has been moved out of the cradle assemblies, water ballast 29 is removed as necessary from the sidewall tanks 22 to buoy the cradle assemblies to the draft elevation illustrated in FIGURE 3. All of the pins 8 of the pin connections 3, and all of the pins 26 of the slidable interlocks 14 are then removed, and water ballast is then pumped or otherwise ejected from the floor structure wing tanks 4 so that the floor structure 21 is floated upwardly, guided by the vertical slidable interlocks 14, from its dotted line elevation to its full line elevation as shown in FIGURE 3. The sidewall tanks 22 may then be floated away, leaving the floor structure 21 in floating condition.

Thus has been described the dry-docking method and apparatus which achieves all of the objects of the invention.

What is claimed is:

1. The method of utilizing an existing dry dock for dry-docking a ship having deep draft such that the ship is incapable of floating within the dry dock when the latter is flooded by reason of said dry dock having a ship-supporting floor disposed at an elevation which is lower than the water level of the waterway in which said ship is initially floating but higher than the underbottom of the ship in its floating condition, comprising the steps of cradling said ship in a floating cradle structure while the ship is in its floating condition, then buoying said cradle structure to elevate said cradle structure and said ship to a draft elevation whereat the underbottoms of both are higher than said elevation of the dry dock floor for floating clearance of the cradle structure and ship with respect to the same, flooding said dry dock, then floating said buoyed cradle structure and ship within said dry dock in superposed relation with respect to said dry dock floor, and thereafter bringing said cradle structure and ship into floor supported relation with said dry dock floor and dewatering said flooded dock.

2. The method of dry-docking a ship in a dry dock having a ship-supporting floor disposed at an elevation which is higher than the underbottom of the ship in its floating condition, comprising the steps of first assembling and preconditioning a floating cradle for receiving said ship therein, said cradle including a floor structure for ultimately supporting said ship, said assembling and preconditioning of said cradle comprising the steps of floating said cradle floor structure, placing cribbing on said cradle floor structure to receive and support the underbottom of said ship, positioning a ballasted but floating sidewall tank in adjacent relation with each of the respective opposite sides of said cradle floor structure, the undersides of both said sidewall tanks being at the same draft elevation, sinking and guiding said floor structure relative to said sidewall tanks to a depth whereat its underside is substantially at said draft elevation of the sidewall tanks, attaching said cradle floor structure to both of said sidewall tanks to thereby fully assembly said cradle, and thereafter altering the draft elevation of said cradle to that whereby the tops of said cribbing is at a draft elevation which is lower than the floating draft of said ship to thereby fully precondition said cradle for receiving said ship, then moving said ship into said cradle from an open end of the latter and positioning said ship over said cribbing, removing at least some of the ballast from each of said sidewall tanks to buoy said cradle both to support said ship on said cribbing and to elevate said cradle and said ship to a draft elevation whereat the underside of said cradle is higher than said elevation of the dry dock floor for floating clearance of the cradle with respect to the same, then moving said cradle and ship into said dry dock in superposed floating relation with respect to said dry dock floor, said dry dock then being in flooded condition, adding ballast to each of said sidewall tanks to sink said cradle and ship into floor supported relation with said dry dock floor, and thereafter detaching both of said sidewall tanks from said cradle floor structure, removing at least said added ballast from each of said sidewall tanks to refloat the same within said dry dock, and then moving both of said sidewall tanks out of said dry dock.

3. The method of launching a deep-draft ship into a waterway from a dry dock in which said ship is incapable of floating when said dry dock is flooded by reason of said dry dock having a ship-supporting floor disposed at an elevation which is lower than the water level of said waterway but higher than that of the underbottom of the ship in its floating condition, comprising the steps of providing a bottom support under said ship, said bottom support being detached from said floor of the dry dock, flooding said dry dock, positioning a floating sidewall tank in adjacent relation with each of the respective opposite sides of said bottom support, then lowering the respective draft elevations of said sidewall tanks to a depth whereat their respective undersides are substantially at the elevation of the underside of said bottom support, and rigidly attaching said bottom support to each of said tanks to thereby form a floatable cradle for supporting said ship, altering the draft elevation of said cradle to float the same clear of said dry dock floor with said ship supported therein, then moving cradle and ship out of said dry dock into said waterway, lowering the draft elevation of said cradle to permit said ship to float free and clear of said bottom support, and providing relative movement between said ship and said cradle whereby said ship floats in said waterway outside of said cradle.

4. The method of dry-docking a deep-draft ship in a dry dock having a ship-supporting floor disposed at an elevation which is lower than the water level of the waterway in which the ship is initially floating but higher than the underbottom of the ship in its floating condition, comprising the steps of assembling and preconditioning a floating cradle for receiving said ship therein, said cradle including a floor structure for ultimately supporting said ship, said assembling and preconditioning of said cradle comprising the steps of floating said cradle floor structure, positioning a floating sidewall tank in adjacent relation with each of the respective opposite sides of said cradle floor structure, the undersides of both said sidewall tanks being at the same draft elevation, sinking and guiding said floor structure relative to said sidewall tanks to a depth whereat the draft elevation of its underside is at least as low as that of the undersides of said sidewall tanks, rigidly attaching said cradle floor structure to both of said sidewall tanks when so positioned relative to each other to thereby fully assemble said floating cradle, and altering the draft elevation of said cradle to receive said floating ship over said cradle floor structure, thereby fully preconditioning said cradle for receiving said ship, then providing relative movement between said ship and said cradle whereby said ship is positioned over said cradle floor structure, altering the draft elevation of said cradle both to support said ship on said floor structure and to elevate said cradle and said ship to a draft elevation whereat all underside portions of said cradle and ship are higher than said elevation of the dry dock floor for floating clearance with respect to the same, then moving said cradle and ship into said dry dock in superposed floating relation with respect to said dry dock floor, said dry dock then being in flooded condition, then altering the draft elevation of said cradle whereby its said floor structure rests on said dry dock floor, detaching said sidewall tanks from said cradle floor structure, floating and moving both of said sidewall tanks free and clear of said cradle floor structure, and then dewatering said dry dock.

5. The method according to claim 4 wherein said dry dock is a floating type dry dock, and said method further comprises altering the draft elevation of said floating dry dock whereby its ship-supporting floor is disposed at said elevation.

References Cited by the Examiner

UNITED STATES PATENTS

| | | | |
|---|---|---|---|
| 210,185 | 11/1878 | Clark et al. | 61—65 X |
| 256,608 | 4/1882 | Watts | 61—65 |
| 601,554 | 3/1898 | Clark | 114—46 |
| 2,379,904 | 6/1945 | Harris | 114—46 |
| 3,133,420 | 5/1964 | Burnett | 61—64 |

FOREIGN PATENTS

| | | |
|---|---|---|
| 306,764 | 1918 | Germany. |
| 1,944 | 1882 | Great Britain. |
| 14,127 | 1852 | Great Britain. |
| 465,860 | 1951 | Italy. |

CHARLES E. O'CONNELL, *Primary Examiner*,

JACOB SHAPIRO, *Examiner*.